United States Patent [19]

Gleghorn et al.

[11] Patent Number: 4,922,152
[45] Date of Patent: May 1, 1990

[54] SYNCHRONOUS MACHINE ROTOR LAMINATION

[75] Inventors: R. Linn Gleghorn, Lansdale, Pa.; Paul D. Wagner, Little Rock, Ark.

[73] Assignee: Siemens Energy & Automation, Inc., Atlanta, Ga.

[21] Appl. No.: 364,543

[22] Filed: Jun. 7, 1989

Related U.S. Application Data

[63] Continuation of Ser. No. 224,642, Jul. 27, 1988, abandoned.

[51] Int. Cl.⁵ .................... H02K 15/02; H02K 21/12
[52] U.S. Cl. .................................... 310/156; 310/261; 29/598
[58] Field of Search ............... 310/156, 162, 163, 166, 310/201, 216, 261, 264, 265; 29/598

[56] References Cited

U.S. PATENT DOCUMENTS

| | | | |
|---|---|---|---|
| 2,733,362 | 1/1956 | Bauer et al. | 310/162 |
| 2,769,108 | 10/1956 | Risch | 310/265 |
| 2,989,655 | 6/1961 | Honsinger | 310/211 |
| 3,016,482 | 1/1962 | Andersen et al. | 318/224 |
| 3,045,135 | 7/1962 | Honsinger | 310/212 |
| 3,047,755 | 7/1962 | Angst et al. | 310/162 |
| 3,652,885 | 3/1972 | Honsinger | 310/163 |
| 3,862,446 | 1/1975 | Hilgeman et al. | 310/163 |
| 4,127,786 | 11/1978 | Volkrodt | 310/156 |
| 4,139,790 | 2/1979 | Steen | 310/166 |
| 4,358,696 | 11/1982 | Liu et al. | 310/156 |
| 4,358,697 | 11/1982 | Liu et al. | 310/162 |
| 4,476,408 | 10/1984 | Honsinger | 310/162 |

Primary Examiner—Patrick R. Salce
Assistant Examiner—Emanuel Todd Voeltz
Attorney, Agent, or Firm—James G. Morrow, Esq.; Volker R. Ulbrich, Esq.; Lawrence C. Edelman, Esq.

[57] ABSTRACT

A rotor lamination for a permanent magnet synchronous machine. The rotor lamination can be used for a two, four or eight pole synchronous machine. The orientation of the permanent magnets determines the number of poles of the machine. The lamination can also include openings adapted to contain conductors used to bring a synchronous motor up to synchronous speed as an induction motor.

14 Claims, 3 Drawing Sheets

4,922,152

SYNCHRONOUS MACHINE ROTOR LAMINATION

CROSS-REFERENCE TO RELATED APPLICATION

This is a continuation of Ser. No. 07/224,642 filed on July 27, 1988 now abandoned.

BACKGROUND OF THE INVENTION

This invention relates to a synchronous machine. More particularly, this invention relates to a rotor lamination for a multi-pole permanent magnet synchronous machine.

A synchronous motor is a synchronous machine which is characterized by its ability to run at a constant speed which is independent of motor load. The constant speed of the motor is dependent upon the frequency of the motor current and the number of motor poles. Therefore, for a given frequency current, the motors constant speed is dependent upon the number of motor poles.

For many applications the frequency of the motor current is 60 Hz which corresponds to the frequency of the power supplied by utilities. (50 Hz for many European countries.) Synchronous motors are manufactured having a number of poles corresponding to a desired constant operating speed. For example, at 60 Hz a 2 pole machine will operate at 3600 rpm, a 4 pole machine at 1800 rpm and an 8 pole machine at 900 rpm. To obtain very specialized speeds, the frequency and pole number can be varied. For example, to obtain a speed of 2040 rpm 68 Hz current and 4 poles could be used.

Referring to the drawings, FIG. 1 illustrates a rotor lamination for a 2 pole permanent magnet motor and FIG. 2 illustrates a rotor lamination for a 4 pole machine. Presently, different rotor laminations are used to produce permanent magnet motors having differing numbers of poles. As a result, different tooling is required to produce the different rotor laminations for motors having differing numbers of poles. Thus, for a manufacturer producing 2, 4 and 8 pole motors, three different types of lamination producing dies are required.

Accordingly, it would be desirable to have a rotor lamination which could be used universally in 2, 4 and 8 pole machines.

BRIEF DESCRIPTION OF THE INVENTION

One object of the invention is to provide a universal rotor lamination useable with a permanent magnet synchronous machine having differing numbers of poles.

An advantage of the present invention is the ability to use the rotor lamination for synchronous machines having 2, 4 and 8 poles. This ability eliminates the cost of tooling and/or retooling required when laminations for machines having differing numbers of poles are required.

Another advantage of the present invention is that the rotor lamination may be configured such that all of the permanent magnets used in the motor are of the same size.

Accordingly, there is provided a rotor lamination for a synchronous machine comprising a piece of lamination material. The lamination includes an opening adapted to accept the machine shaft, at least four radially extending openings each adapted to contain a magnet, and at least eight interior openings each adapted to contain a magnet. Each opening defines a longitudinal axis, wherein the longitudinal axis of each interior opening intersects with the longitudinal axis of the interior openings it is adjacent to.

DETAILED DESCRIPTION OF THE PREFERRED EMBODIMENT

Figure 1:
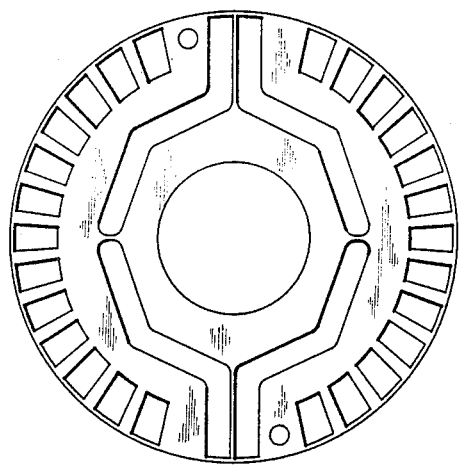
FIG. 1 illustrates a prior art rotor lamination for a two-pole motor.
Figure 2:
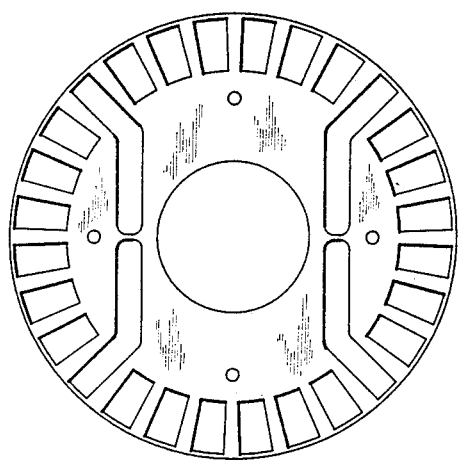
FIG. 2 illustrates a prior art rotor lamination for a four-pole motor.
Figure 3:
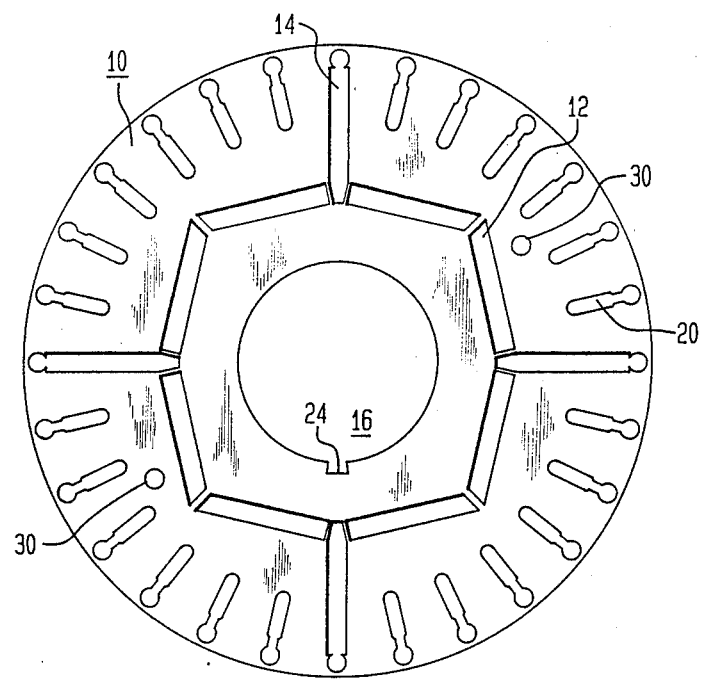
FIG. 3 illustrates a rotor lamination useable in a 2, 4 or 8 pole machine.

Turning now to the drawings, FIG. 3 illustrates the preferred embodiment of the rotor lamination. This lamination is used for 2, 4 or 8 pole machines and may be either stamped or laser cut from an appropriate lamination material. The openings 12 and 14 are adapted to contain permanent magnets and the opening 16 is adapted to accept the machine shaft. By way of example, the permanent magnets 18 may be fabricated from materials such as barium or strontium ferrites, commonly known as ceramic magnets, or samarium cobalt commonly known as rare earth magnets. Additionally, the magnets 18 can all be fabricated having the same shape and size since the preferred embodiment is configured so that all the magnet openings 12, 14 are adapted to accept magnets of the same size. The relationship between the polarity of the magnets 18 in the openings 12, 14 determines whether the machine will be 2, 4 or 8 poles.

The embodiment of the rotor lamination 10 illustrated in FIGS. 3-6 is configured for use in a synchronous motor. The lamination 10 includes a plurality of induction conductor openings 20 adapted to contain a conductive material. These openings 20 are located as close as practical to the periphery of the lamination. The lamination 10 also includes a circular shaft opening 16 with a key-way 24 adapted to cooperate with a key to prevent rotation of the laminations 10 relative to the motor shaft.

The openings 20 are provided for conductive material so that the motor can be brought up to synchronous speed from stand still as an induction motor. The conductors contained in the openings 20 also serve to dampen oscillations about a motor's synchronous speed. By way of example, the conductors can be fabricated from a conductive and non-magnetic material such as aluminum.

The lamination 10 also includes four radially extending openings 14 and eight interior openings 12, each opening 12, 14 includes a magnet portion 26 adapted to contain a magnet 18 having a substantially rectangular cross-section. The magnet portions 26 all have the same size and shape. The openings 12 are arranged such that the magnets 18 in the openings 12 are as close to the air gap (periphery of the rotor) as possible, while also maintaining the largest magnet portions 26 possible.

The holes 30 in the lamination 10 serve as alignment holes for stacking laminations 10 and then fastening the laminations 10 together before die casting.

Figure 4:
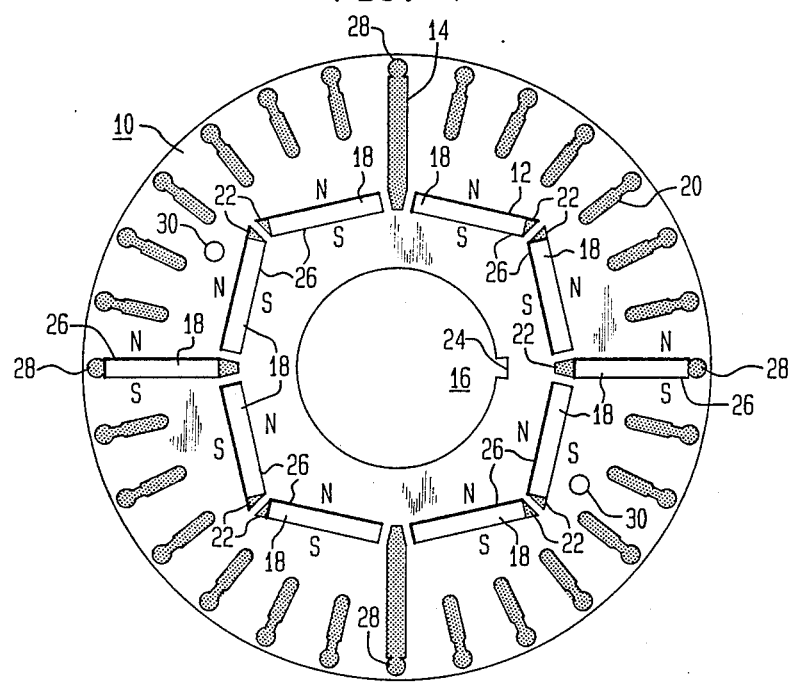
FIG. 4 illustrates the orientation of the rotor magnets for a 2 pole machine.

FIG. 4 illustrates the configuration of the magnets 18 wherein the rotor is set up for a two pole synchronous machine. All of the darkened openings 22, 28, 20 are filled with aluminum. The aluminum in the tip portions 22 functions to fix the magnets 18 in position and, more importantly, to increase the reluctance of the rotor at the location of the tip portions 22 so that the magnetic flux of the magnets is better directed from one pole to the other via the air gap. The openings 14 include conductor portions 28 filled with aluminum which serves to fix the magnets 18 in position and provide for a conductive path near the air gap. The openings 14 also include a portion 28 filled with aluminum which also serves to fix the magnets 18 in position and to increase the reluctance of the rotor at the location of the portion 28 so that the flux of the magnets 18 is better directed.

Figure 5:
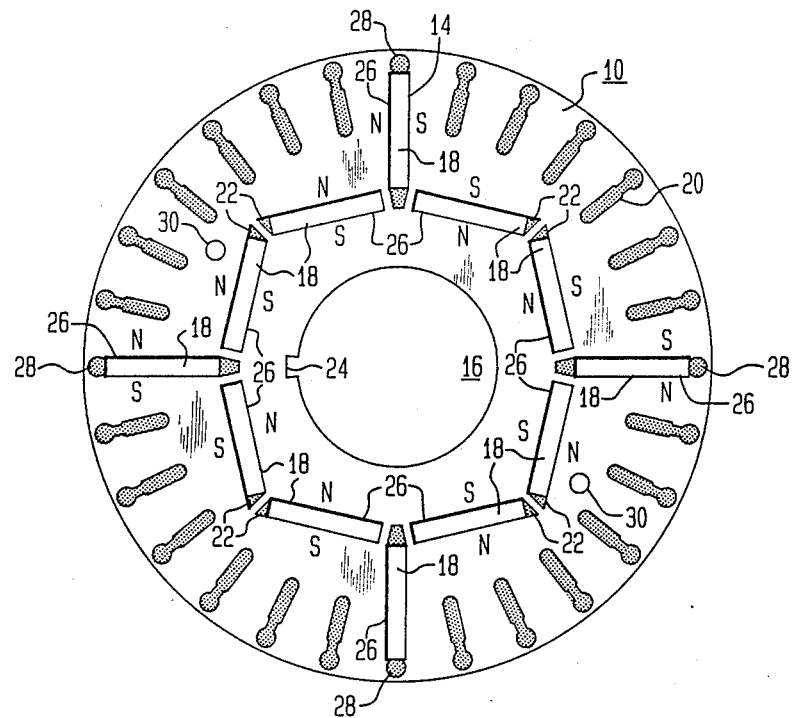
FIG. 5 illustrates the orientation of the rotor magnets for a 4 pole machine.
Figure 6:
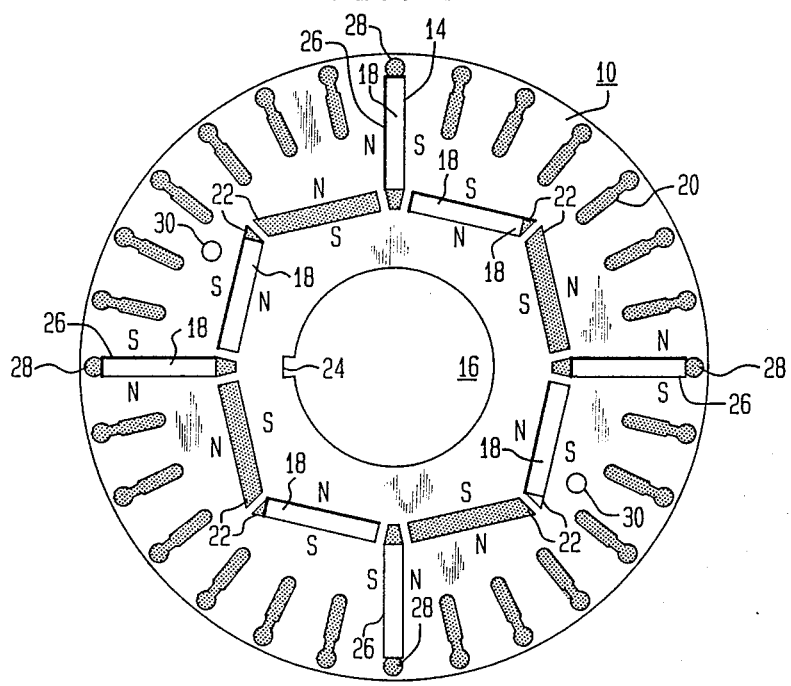
FIG. 6 illustrates the orientation of the rotor magnets for an 8 pole machine.

FIG. 5 illustrates the configuration of the magnets 18 wherein the rotor is set up for a four pole synchronous machine and FIG. 6 illustrates the configuration of the magnets 18 such that the rotor is set up for an eight pole synchronous machine. The configuration of FIG. 5 requires two more magnets 18 than the configuration in FIG. 4 since the openings 14 at the poles of the two pole rotor contain conductors. The configuration of FIG. 6 only uses four of the eight openings 12 to produce the proper magnetic field for an eight pole rotor.

While one embodiment the lamination and several modifications thereof have been shown and described in detail herein, various other changes and modifications may be made without departing from the scope of the present invention. For example, the rotor lamination could be used for a synchronous generator. By way of another example, the conductor portions 28 could be eliminated and the openings 20 located on a smaller radius so that the diameter of the rotor lamination can be reduced even though the same die is used to punch the openings 12, 14.

We claim:

1. A universal rotor lamination for a synchronous machine comprising a circular piece of lamination material defining:
    a periphery;
    a shaft opening adapted to accept the machine shaft, the opening being centrally disposed within the circular piece;
    at least four radially extending openings each defining a longitudinal axis and adapted to contain a magnet, the radially extending openings being disposed intermediate the periphery and the shaft opening, wherein the longitudinal axes of two of the radially extending openings coincide and are substantially perpendicular to the longitudinal axes of the other two radially extending openings; and
    at least eight interior openings each adapted to contain a magnet, each opening defining a longitudinal axis, wherein the longitudinal axis of each interior opening intersects with the longitudinal axis of the interior openings it is adjacent to, and the eight interior openings are disposed intermediate the periphery and the shaft opening;
    the lamination being universally useable in any of synchronous machines having two, four, and eight poles.

2. The lamination of claim 1, wherein the radially extending openings each define a first conductor portion, the first conductor portion being adapted to contain conductor material.

3. The lamination of claim 2, wherein the interior openings each define a tip portion, the tip portion being adapted to contain conductor material.

4. The lamination of claim 1, wherein the radially extending openings and interior openings each define a portion adapted to contain a magnet having a substantially rectangular cross-section, all of the portions having the same size and shape.

5. The lamination of claim 4, further defining a plurality of induction conductor openings adapted to contain a conductive material.

6. The lamination of claim 5, further defining a plurality of alignment openings.

7. A universal rotor lamination for a synchronous motor defining:
    a circular periphery;
    a substantially circular shaft opening adapted to accept the machine shaft, the opening being centrally disposed within the lamination;
    a plurality of induction conductor openings adapted to contain a conductive material;
    at least four radially extending openings, each opening defining a longitudinal axis and including a magnet portion adapted to contain a magnet having a substantially rectangular cross-section, the radially extending openings being disposed intermediate the periphery and the shaft opening such that the longitudinal axes of adjacent radially extending openings are substantially perpendicular;
    at least eight interior openings, such opening defining a longitudinal axis and including a magnet portion adapted to contain a magnet having a substantially rectangular cross-section, wherein each longitudinal axis is tangent to the periphery of a circle which is concentric with the motor shaft;
    the magnet portions of the radially extending openings and the interior openings having the same size and shape, and
    the lamination being universally useable in any of synchronous motors having two, four, and eight poles.

8. The lamination of claim 7, wherein the radially extending openings each define a first conductor portion, the first conductor portion being adapted to contain conductor material.

9. The lamination of claim 8, wherein the interior openings each define a tip portion, the tip portion being adapted to contain conductor material.

10. The lamination of claim 9, further defining a plurality of alignment openings.

11. A universal rotor lamination for a synchronous motor defining:
    a center and a periphery;
    a plurality of induction conductor openings adapted to contain a conductive material;
    at least four radially extending openings located between the center and the periphery, each opening including a magnet portion adapted to contain a magnet having a substantially rectangular cross-section;
    at least four interior openings located between the center and the periphery, each opening defining a longitudinal axis and including a magnet portion adapted to contain a magnet having a substantially rectangular cross-section, wherein the longitudinal axes intersect to form a first square having a center corresponding to the center of lamination; and at least four interior openings located between the center and the periphery, each opening defining a longitudinal axis and including a magnet portion adapted to contain a magnet having a substantially rectangular cross-section, wherein the longitudinal axes intersect to form a second square having a center corresponding to the center of the lamination, the second square being offset from the first square;

wherein the magnet portions have the same size and shape, and the laminations are universally useable in any of synchronous motors having two, four, and eight poles.

12. The lamination of claim 11, wherein the radially extending openings each define a first conductor portion, the first conductor portion being adapted to contain conductor material.

13. The lamination of claim 12, wherein the interior openings each define a tip portion, the tip portion being adapted to contain conductor material.

14. The lamination of claim 13, further defining a plurality of alignment openings.

* * * * *